United States Patent
Shao et al.

(10) Patent No.: US 9,658,824 B1
(45) Date of Patent: May 23, 2017

(54) EXTRACTING TOPICS FROM CUSTOMER REVIEW SEARCH QUERIES

(75) Inventors: Peng Shao, Seattle, WA (US); Le Huang, Seattle, WA (US); Madhu M. Kurup, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 779 days.

(21) Appl. No.: 13/540,149

(22) Filed: Jul. 2, 2012

(51) Int. Cl.
*G06F 7/00* (2006.01)
*G06F 17/30* (2006.01)

(52) U.S. Cl.
CPC ............... *G06F 7/00* (2013.01); *G06F 17/30* (2013.01)

(58) Field of Classification Search
CPC ......... G06F 17/30864; G06F 17/30867; G06F 17/30637; G06Q 30/02; G06Q 30/0241
See application file for complete search history.

(56) References Cited

U.S. PATENT DOCUMENTS

| | | | |
|---|---|---|---|
| 2007/0179835 A1* | 8/2007 | Ott et al. | 705/10 |
| 2008/0215571 A1* | 9/2008 | Huang et al. | 707/5 |
| 2011/0208669 A1* | 8/2011 | Ruhl et al. | 705/347 |
| 2012/0246156 A1* | 9/2012 | Gupta et al. | 707/731 |
| 2013/0066887 A1* | 3/2013 | Downs et al. | 707/749 |

\* cited by examiner

*Primary Examiner* — Tuan A Pham
(74) *Attorney, Agent, or Firm* — Thomas | Horstememeyer,LLP (57) ABSTRACT

Relevant topics for an item may be extracted from customer review search queries. Customer review search queries are obtained from customers to search a collection of customer reviews for a specific item. Relevant topics for the specific item are extracted by analyzing the queries. A user interface is generated based at least in part on at least some of the relevant topics.

26 Claims, 5 Drawing Sheets

EXTRACTING TOPICS FROM CUSTOMER REVIEW SEARCH QUERIES

BACKGROUND

Online retailers and other network sites may allow customers to write and submit reviews of products. The customer reviews may include customer opinions and ratings of the products, facts regarding customer experiences with the products, and/or other information about the products. Customer reviews may influence customers to purchase, or to refrain from purchasing, the corresponding products. The customer reviews may be presented, for example, on detail pages that describe the products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to extracting relevant topics for an item from customer review search queries. As customer review functionality becomes increasingly popular, it may be that hundreds or thousands of customer reviews are obtained for an item. Navigating through all of the customer reviews for an item may be impractical for users when so many customer reviews are present. Consequently, a search tool may be provided for a user to search in the customer reviews to find those reviews which are relevant for the user. Users may enter customer review search queries through the search tool, and these queries may be stored.

Various embodiments of the present disclosure leverage customer review search queries to identify topics of interest related to a particular item. Such topics of interest may include those which may normally be unidentifiable, or at least difficult to identify, from data typically associated with the item. For example, topics extracted from customer review search queries about an item may include names of competing items, uses of the item, important attributes about the item, and so on. The extracted topics may be presented to users in a user interface to assist in selecting relevant customer reviews for viewing, searching customer reviews, searching items, and/or for other purposes. In the following discussion, a general description of the system and its components is provided, followed by a discussion of the operation of the same.

Figure 1:
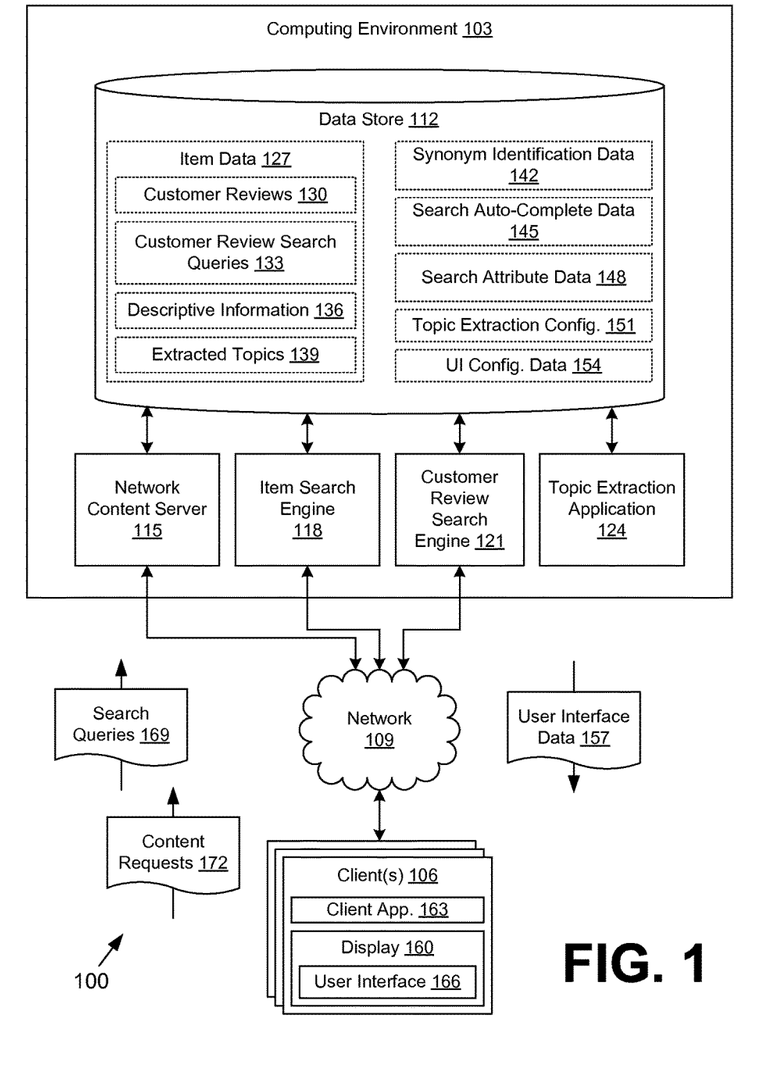
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, computing environment 103 may include a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 112 that is accessible to the computing environment 103.

The data store 112 may be representative of a plurality of data stores 112 as can be appreciated. The data stored in the data store 112, for example, is associated with the operation of the various applications and/or functional entities described below.

The components executed on the computing environment 103, for example, include a network content server 115, an item search engine 118, a customer review search engine 121, a topic extraction application 124, and other applications, services, processes, systems, engines, or functionality not discussed in detail herein. The network content server 115 is executed to generate and serve up content such as network pages (e.g., web pages, etc.), data for mobile application screens, and/or other forms of network content. In one embodiment, the network content server 115 comprises a commercially available hypertext transfer protocol (HTTP) server such as Apache® HTTP Server, Apache® Tomcat®, Microsoft® Internet Information Services (IIS), and/or other servers.

The item search engine 118 is executed to facilitate searching of a catalog or collection of items according to search queries. Such searches may be executed on search strings provided by users. Also, the item search engine 118 may facilitate browsing a taxonomy, or hierarchical structure, which organizes a catalog or collection of items. The customer review search engine 121 is executed to facilitate searching of a collection of customer reviews corresponding to an item or to multiple items. Such searches may be executed on search strings provided by users. The topic extraction application 124 is executed to process stored customer review search queries to identify or extract topics of interest relevant to items or similar items.

The data stored in the data store 112 includes, for example, item data 127 including customer reviews 130, customer review search queries 133, descriptive information 136, extracted topics 139, etc.; synonym identification data 142; search auto-complete data 145; search attribute data 148; topic extraction configuration 151; user interface (UI)

configuration data 154; and potentially other data. The item data 127 includes various information about a catalog or collection of items. As used herein, "item" may refer to any product, service, business entity, social networking profile, etc. that may be described through networked content and reviewed by customers. In some cases, items may be offered online through the network content server 115 for purchase, rental, lease, download, or other forms of consumption. The item data 127 may include data that may be used to identify item similarities, e.g., explicit links between items, purchase histories, browse histories, item categorizations, and so on.

The customer reviews 130 may correspond to ratings, categorizations, textual reviews, and/or other forms of feedback from customers regarding items included in content served up by the network content server 115. In one embodiment, the customer reviews 130 may be categorized as being positive, negative, informative, and so on. Although described as "customer" reviews, it is understood that, in some embodiments, the term "customer" may refer to users who have not in fact purchased, leased, downloaded, or otherwise consumed the item. The customer review search queries 133 correspond to search queries which have been previously obtained from users at clients 106 and executed by the customer review search engine 121. The customer review search queries 133 may be organized, for example, by item or groupings of items to facilitate ease of retrieval.

The descriptive information 136 may include various data used in generating detail pages for items, catalog entries, and/or other networked content regarding items. To this end, the descriptive information 136 may include title, description, price, weight, shipping category, tax classification, categories, relationships to other items, images, audio clips, video clips, and/or other data. The extracted topics 139 correspond to topics of interest that have been identified from the customer review search queries 133 by the topic extraction application 124. Such extracted topics 139 may correspond to unigrams (i.e., one-word terms), bigrams (i.e., two-word terms), and/or terms of arbitrary length. In some embodiments, the extracted topics 139 may be extracted based at least in part on data from the customer reviews 130, other item data 127, search queries executed through the item search engine 118, and/or other data.

The synonym identification data 142 includes dictionaries or other data to enable synonym detection and grouping. For example, "children" and "kids" may be related as synonyms by the synonym identification data 142. For purposes of discussion, synonyms may include other forms of similar words, such as words having the same root (e.g., "play," "player," "played," etc.), misspellings, translations, and so on.

The search auto-complete data 145 includes that that enables a search auto-complete or suggestion feature for the item search engine 118 and/or the customer review search engine 121. In the search auto-complete feature, a user may begin typing characters or words in a search box, and one or more suggestions may be presented in conjunction with the search box to facilitate selection. The search attribute data 148 corresponds to data that enables refinement of an item search, item search results, a customer review search, customer review search results, etc. For example, a user may search for a "digital camera," and the search attribute data 148 may configure refinement of the search query by the attribute "type" having potential values of "consumer grade" or "professional grade."

The topic extraction configuration 151 may configure various parameters of the topic extraction application 124. For example, the topic extraction configuration 151 may configure how the synonym identification data 142 is used, whether bigrams are mapped to popular unigrams and vice versa, how many topics are to be extracted, thresholds for a minimum number of customer reviews 130 or customer review search queries 133 for an item, whether customer review search queries 133 for similar items are to be employed, and so on. The UI configuration data 154 includes various data that may be used by the network content server 115 in generating the user interface data 157 that may be sent to the client 106. The user interface data 157 may correspond to network pages, portions of network pages, data used to configure or populate mobile application screens, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as liquid crystal display (LCD) screens, gas plasma-based flat panel displays, LCD projectors, or other types of display devices, etc.

The client 106 may be configured to execute various applications such as a client application 163 and/or other applications. The client application 163 may correspond to a browser, a mobile application, and/or other applications. The client application 163 may be executed to obtain user interface data 157 and/or other network content served up by the computing environment 103 and/or other servers, thereby rendering a user interface 166 on the display 160. Further, the client application 163 may be configured to send search queries 169 and content requests 172 to the computing environment 103. The client 106 may be configured to execute applications beyond the client application 163 such as, for example, mobile applications, email applications, instant message applications, and/or other applications.

Next, a general description of the operation of the various components of the networked environment 100 is provided. To begin, a user at the client 106 employs the client application 163 to submit various search queries 169 to the customer review search engine 121. The customer review search engine 121 may be configured to search all of the customer reviews 130, customer reviews 130 for a currently selected item, customer reviews 130 for items similar to a currently selected item, and/or other collections of customer reviews 130. A particular item may be currently selected, for example, when a user employs a customer review search tool on a detail page user interface 166 for the particular item. Alternatively, the user may explicitly specify a currently selected item to determine the collection of customer reviews 130.

The customer review search engine 121 then returns at least a portion of the matching customer reviews 130 to the client 106 in the user interface data 157, which configures a user interface 166 to present the customer reviews 130 which match the search query 169. The search query 169, which may correspond to a textual string of one or more keywords or terms, may be recorded in the customer review search queries 133. In this way, a multitude of different customer review search queries 133 may be recorded from the search queries 169 of many different users.

The topic extraction application 124 is then executed to analyze the customer review search queries 133 for an item in order to generate the extracted topics 139 for an item. In some embodiments, the topic extraction application 124 may generate the extracted topics 139 based at least in part on customer search queries 133 for related or similar items, data in the customer reviews 130, other item data 127, and so on. Operation of the topic extraction application 124 may be configured by the topic extraction configuration 151.

The topic extraction application 124 may generate a ranked set of topics or terms from the customer review search queries 133 or other data as described above. The topics may be ranked, for example, by frequency of appearance in the customer review search queries 133 for the item. Other factors relating to appearance in other customer review search queries 133, customer reviews 130, other search queries, etc. may be taken into account as weighted factors in one embodiment. Topics which are synonyms according to the synonym identification data 142 may be grouped together for purposes of ranking, e.g., by frequency of appearance in the customer review search queries 133 for the item.

In some embodiments, unigram and bigram terms are identified. In one embodiment, the bigram terms for an item may be subsumed into the unigram terms for an item under certain criteria. In another embodiment, the unigram terms for an item may be subsumed into the bigram terms for an item under certain criteria (e.g., both unigram and bigram are in the top N ranked topics, etc.). When a first term is subsumed into a second term, the credit for frequency of appearance, etc. may then be credited to the second term for purposes of ranking.

The extracted topics 139, which may be ranked, may then be stored in the extracted topics 139 for an item. The topic extraction application 124 may be executed again periodically or aperiodically to update the extracted topics 139 as the underlying data (e.g., the customer review search queries 133, etc.) changes. In one embodiment, the extracted topics 139 may be extracted or ranked based at least in part on a respective term frequency/inverse document frequency metric for each of the topics in the collection of customer reviews 130 for the item (or similar items, if applicable).

Once the extracted topics 139 are generated, the extracted topics 139 may be presented in or employed in various user interfaces 166 generated and served up by the network content server 115 in response to content requests 172 by users at clients 106. For example, the extracted topics 139 may be used in a search user interface 166 for the item search engine 118 to provide refining attribute values or to rank search results by relevance. Further examples may include using the extracted topics 139 in a search user interface 166 for the customer review search engine 121 to provide suggested terms or refining attribute values, in user interfaces 166 for browsing or presenting relevant customer reviews 130 for an item, in search suggestion tools providing auto-complete features, and so on.

In one embodiment, the user interface 166 may present one or more groupings of items that are generated based at least in part on the extracted topics 139. For example, the user interface 166 may present a listing of items characterized as "zoom-friendly cameras." The items that are selected in the listing may be selected according to a quantity of corresponding customer reviews 130 or customer review search queries 133 for the item being associated with an extracted topic 139 of "zoom friendly."

In various embodiments, the user interface 166 may include components (e.g., buttons, links, etc.) for each relevant topic that, when selected, causes the user interface 166 to present a subset of the collection of customer reviews for the specific product. The subset that is presented upon selection is pertinent to the respective relevant topic.

Figure 2A:
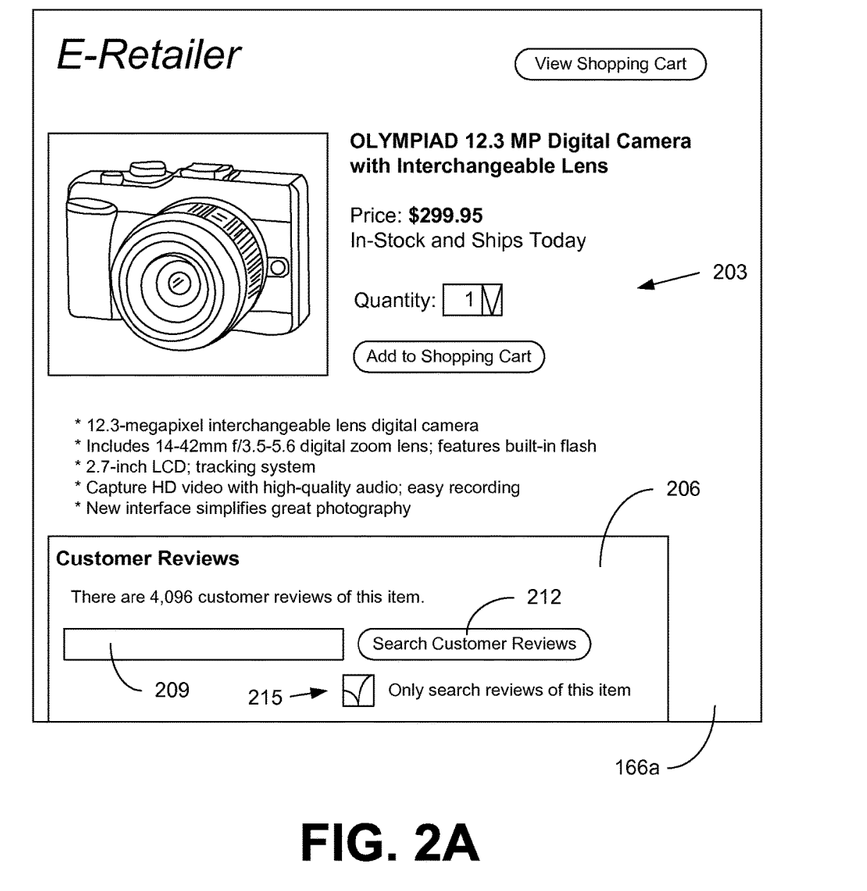
FIGS. 2A and 2B are drawing of examples of user interfaces rendered by a client in the networked environment of FIG. 1 according to various embodiments of the present disclosure.

Turning now to FIG. 2A, shown is an example user interface 166a rendered by a client application 163 (FIG. 1) executed in a client 106 (FIG. 1) in the networked environment 100 (FIG. 1) according to an embodiment of the present disclosure. The user interface 166a corresponds to a detail page for an item that is a digital camera. To this end, the user interface 166a includes various item information 203 such as price, title, inventory status, image, description, etc. The user interface 166a may include a customer reviews section 206. The customer reviews section 206 may include various customer reviews 130 (FIG. 1) for the item, excerpts from customer reviews 130, navigational aids to access other customer reviews 130, summaries of ratings from customer reviews 130, and so on.

The customer reviews section 206 may include a customer reviews search box 209 and a customer reviews search submission component 212 in order for a user to specify a search query 169 (FIG. 1) for searching the customer reviews 130. One or more search refining components 215 may be provided to control the scope of the customer reviews 130 search. For example, the search refining components 215 may include a checkbox which may be preselected to limit the scope of the search to customer reviews 130 for the particular item discussed in the user interface 166. Deselecting the checkbox may, for example, cause the search to be performed in all customer reviews 130, customer reviews 130 for related or similar items, etc.

Figure 2B:
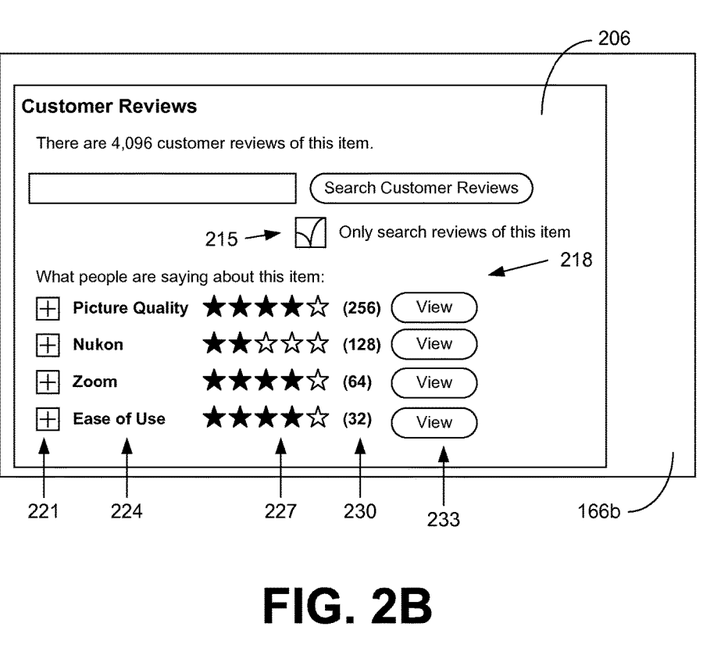

Moving on to FIG. 2B, shown is an example user interface 166b rendered by a client application 163 (FIG. 1) executed in a client 106 (FIG. 1) in the networked environment 100 (FIG. 1) according to an embodiment of the present disclosure. The user interface 166b corresponds to the user interface 166a (FIG. 2A) with an expanded customer reviews section 206 that presents a listing 218 of at least some of the extracted topics 139 (FIG. 1) for the item. The extracted topics 139 presented in the listing 218 may correspond to the most relevant topics, which may correspond to a frequency of occurrence in the customer review search queries 133 (FIG. 1), a frequency of occurrence in different customer reviews 130 (FIG. 1), and/or on other factors.

Each of the extracted topics 139 within the listing 218 may include, for example, a component 221 for expanding additional information, a description 224 of the extracted topic 139, a rating summary 227 for the extracted topic 139, a number 230 of customer reviews 130 relevant to the extracted topic 139, a component 233 for viewing at least some of the customer reviews 130 relevant to the extracted topic 139, and/or other components. In some examples, each extracted topic 139 described in the listing 218 may include relevant snippets of text from one or more customer reviews 130 selected based at least in part on popularity, date submitted, reviewer credibility, and/or on other factors.

In one embodiment, when the component 221 is selected for a particular extracted topic 139, a selection of some number or all relevant snippets from customer reviews 130 may be presented. The snippets may be selected, for example, based on use of the particular term or a synonym for the extracted topic 139. Accompanying the snippets may be links or other components for viewing the customer review 130 corresponding to the snippet.

As a non-limiting example, the extracted topic 139 "Nukon" may be identified for the item which is an "Olympiad" digital camera. Suppose that "Nukon" is a competitor to "Olympiad" in the area of digital cameras. The term "Nukon" may appear nowhere in the descriptive information 136 (FIG. 1) for the item. However, a very similar digital camera may be manufactured by "Nukon" and may be discussed by users in customer reviews 130. Users may frequently be searching for customer reviews 130 which discuss "Nukon" in order to ascertain the similarity and differences between the digital cameras. Accordingly, "Nukon" has been automatically identified and relevant customer reviews 130 may be linked by user interface 166b components. In some examples, items relevant to the extracted topic 139 may also be linked by user interface 166b components.

Figure 3:
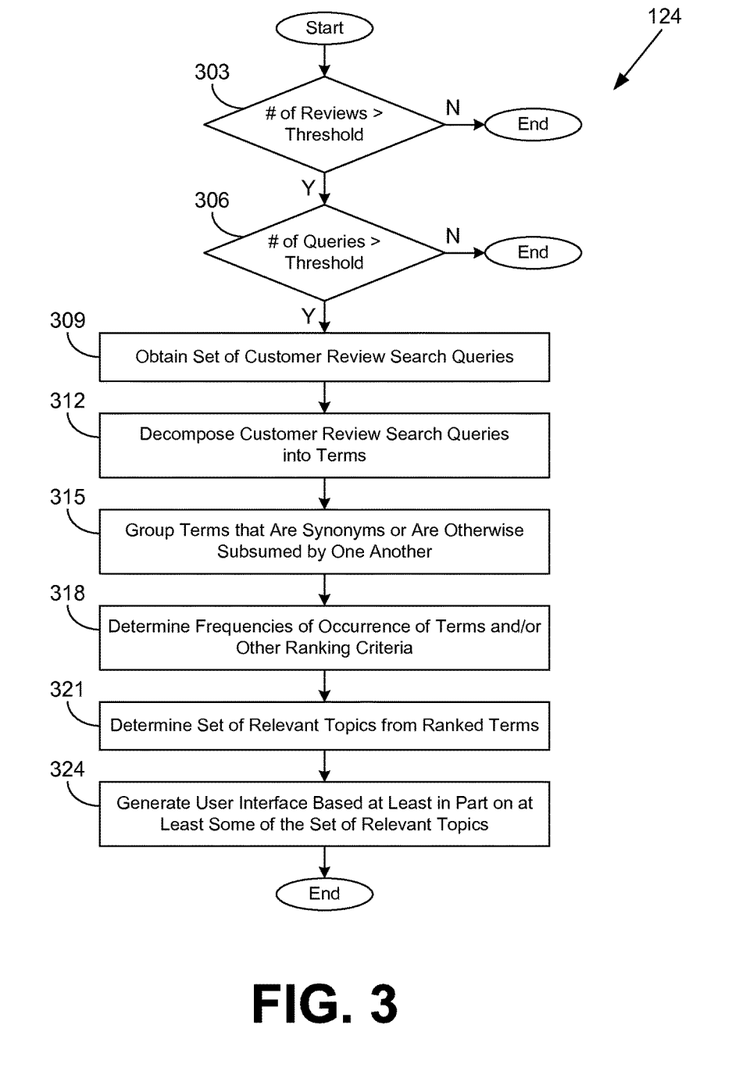
FIG. 3 is a flowchart illustrating one example of functionality implemented as portions of a topic extraction application executed in a computing environment in the networked environment of FIG. 1 according to various embodiments of the present disclosure.

Referring next to FIG. 3, shown is a flowchart that provides one example of the operation of a portion of the topic extraction application 124 according to various embodiments. It is understood that the flowchart of FIG. 3 provides merely an example of the many different types of functional arrangements that may be employed to implement the operation of the portion of the topic extraction application 124 as described herein. As an alternative, the flowchart of FIG. 3 may be viewed as depicting an example of steps of a method implemented in the computing environment 103 (FIG. 1) according to one or more embodiments.

Beginning with box 303, the topic extraction application 124 determines whether the number of customer reviews 130 (FIG. 1) for an item meets a minimum threshold. If not, the portion of the topic extraction application 124 ends. If so, the topic extraction application 124 determines whether the number of customer review search queries 133 (FIG. 1) for an item meets a minimum threshold. If not, the portion of the topic extraction application 124 ends. Although the flowchart of FIG. 3 pertains to processing customer reviews 130 or customer review search queries 133 for a particular item, in other embodiments, the topic extraction application 124 may process customer reviews 130 and/or customer review search queries 133 for multiple items. Also, in some cases, the topic extraction application 124 may be configured to extract topics from customer reviews 130 and/or other data than the customer review search queries 133, which may obviate the threshold check in box 306.

In box 309, the topic extraction application 124 obtains the set of customer review search queries 133 pertaining to customer reviews 130 for an item. Customer review search queries 133 for similar items may be considered in other embodiments. In box 312, the topic extraction application 124 decomposes the customer review search queries 133 into terms such as unigrams, bigrams, etc. In box 315, the topic extraction application 124 groups terms that are synonyms or are otherwise subsumed by other terms. As a non-limiting example, "kid" and "kids" may be grouped with "children's." As another non-limiting example, "picture" may be subsumed into "picture quality" where both are within the N most popular or frequently occurring terms in the customer review search queries 133.

In box 318, the topic extraction application 124 determines frequency of occurrence of terms and/or other ranking criteria for the terms. In box 321, the topic extraction application 124 determines a set of relevant topics from the ranked terms. In box 324, the topic extraction application 124 generates user interface data 157 (FIG. 1) for a user interface 166 (FIG. 1) based at least in part on at least some of the set of relevant topics. The user interface 166 may, for example, present at least some of the relevant topics or use at least some of the relevant topics in generating other content such as clusters of items, etc. Thereafter, the portion of the topic extraction application 124 ends.

Figure 4:
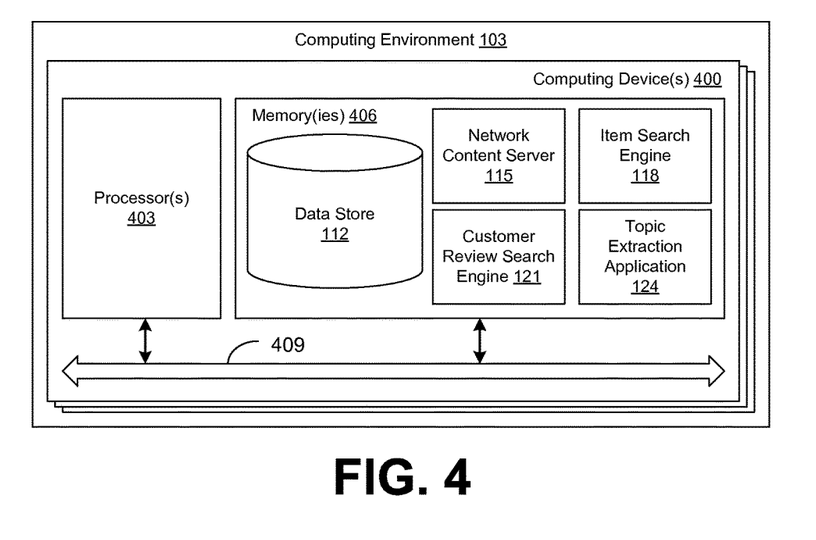
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network content server 115, the item search engine 118, the customer review search engine 121, the topic extraction application 124, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network content server 115, the item search engine 118, the customer review search engine 121, the topic extraction application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the topic extraction application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network content server 115, the item search engine 118, the customer review search engine 121, and the topic extraction application 124, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:

obtain a plurality of customer review search queries from a plurality of users, the plurality of customer review search queries being obtained to search a collection of customer reviews for a specific product;

decompose the plurality of customer review search queries into a plurality of terms, individual ones of the plurality of terms being a unigram or a big ram;

group the plurality of terms that are synonyms of one another based at least in part on synonym identification data;

determine a corresponding frequency of occurrence for the plurality of terms in the plurality of customer review search queries;

determine a set of relevant topics for the specific product from the plurality of terms based at least in part on the corresponding frequencies of occurrence;

generate a user interface configured to present at least some of the set of relevant topics for the specific product in association with information regarding the specific product; and wherein the user interface includes a corresponding component for a respective relevant topic of the at least some of the set of relevant topics that, when selected, causes the user interface to present a subset of the collection of customer reviews for the specific product, the subset of the collection of customer reviews for the specific product being pertinent to the respective relevant topic of the at least some of the set of relevant topics.

2. The non-transitory computer-readable medium of claim 1, wherein the user interface corresponds to a detail page for the specific product.

3. A system, comprising:
at least one computing device; and
at least one application executable in the at least one computing device, wherein, when executed, the at least one application causes the at least one computing device to at least:
obtain a plurality of customer review search queries from a plurality of users, the plurality of customer review search queries being obtained to search a collection of customer reviews for a specific item;
extract a set of relevant topics for the specific item by analyzing the plurality of customer review search queries; and
generate a user interface based at least in part on at least some of the set of relevant topics for the specific item.

4. The system of claim 3, wherein, when executed, the at least one application further causes the at least one computing device to at least:
extract a set of additional relevant topics directly from the collection of customer reviews for the specific item; and
include the set of additional relevant topics into the set of relevant topics.

5. The system of claim 3, wherein the user interface is configured to present the at least some of the set of relevant topics for the specific item in a customer review section of the user interface.

6. The system of claim 3, wherein the user interface is configured to present the at least some of the set of relevant topics for the specific item as refinement attributes for item search functionality provided by the user interface.

7. The system of claim 3, wherein the user interface is configured to present the at least some of the set of relevant topics for the specific item as refinement attributes for customer review search functionality provided by the user interface.

8. The system of claim 3, wherein extracting the set of relevant topics further comprises extracting the set of relevant topics based at least in part on a respective term frequency/inverse document frequency metric for individual ones of the set of relevant topics in the collection of customer reviews.

9. The system of claim 3, wherein extracting the set of relevant topics further comprises extracting the set of relevant topics in response to determining that a quantity of customer reviews for the specific item meets a minimum threshold.

10. The system of claim 3, wherein extracting the set of relevant topics further comprises:
decomposing the plurality of customer review search queries into a set of unigrams and a set of bigrams;
assigning a respective ranking to individual ones of the set of unigrams and to individual ones of the set of bigrams based at least in part on a respective frequency of appearance in the plurality of customer review search queries; and
wherein the set of relevant topics is extracted from the set of unigrams and the set of bigrams based at least in part on the respective frequencies of appearance.

11. The system of claim 10, wherein extracting the set of relevant topics further comprises:
determining a unigram in the set of unigrams that is included in a bigram in the set of bigrams; and
assigning a credit to the respective frequency of appearance of the bigram based at least in part on the respective frequency of appearance of the unigram.

12. The system of claim 10, wherein extracting the set of relevant topics further comprises:
determining a unigram in the set of unigrams that is included in a bigram in the set of bigrams; and
assigning a credit to the respective frequency of appearance of the unigram based at least in part on the respective frequency of appearance of the bigram.

13. The system of claim 3, wherein extracting the set of relevant topics is configured to identify and to group terms that are considered to be synonyms.

14. The system of claim 3, wherein extracting the set of relevant topics further comprises selecting the set of relevant topics by analyzing the plurality of customer review search queries and a plurality of additional customer review search queries, the plurality of additional customer review search queries being obtained to search another collection of customer reviews for at least one item that is similar to the specific item.

15. The system of claim 3, wherein extracting the set of relevant topics further comprises selecting the set of relevant topics based at least in part on a corresponding frequency of individual ones of the set of relevant topics being included in the plurality of customer review search queries.

16. The system of claim 3, wherein extracting the set of relevant topics further comprises selecting the set of relevant topics based at least in part on a corresponding quantity of individual ones of the set of relevant topics being included in the plurality of customer review search queries.

17. The system of claim 3, wherein the at least one application further comprises logic that sends data encoding the user interface to a client in response to a request for content regarding the specific item from the client.

18. The system of claim 3, wherein the user interface includes a corresponding component for individual ones of the at least some of the set of relevant topics that, when selected, causes the user interface to present a subset of the collection of customer reviews for the specific item, the subset of the collection of customer reviews for the specific item being relevant to a respective relevant topic of the at least some of the set of relevant topics.

19. The system of claim 3, wherein the user interface is configured to present a listing of search results that are ranked based at least in part on the at least some of the set of relevant topics.

20. The system of claim 3, wherein the user interface is configured to present a group of items that are selected based at least in part on the at least some of the set of relevant topics.

21. A method, comprising:
obtaining, in at least one computing device, a plurality of customer review search queries from a plurality of users, the plurality of customer review search queries being obtained through a customer review search component in a user interface that facilitates a search of a collection of customer reviews;

extracting, in the at least one computing device, a set of relevant topics for a specific item by analyzing the plurality of customer review search queries; and generating, in the at least one computing device, a user interface based at least in part on at least some of the set of relevant topics for the specific item in association with a user interface presenting information regarding the specific item.

22. The method of claim 21, wherein the collection of customer reviews includes customer reviews regarding the specific item and excludes customer reviews unrelated to the specific item.

23. The method of claim 21, wherein the collection of customer reviews includes customer reviews regarding a plurality of items.

24. The method of claim 21, wherein the user interface is configured to present the at least some of the set of relevant topics in an item search suggestion tool.

25. The method of claim 21, wherein the user interface is configured to present the at least some of the set of relevant topics in a customer review search suggestion tool.

26. The method of claim 21, wherein the user interface includes a corresponding component for individual ones of the at least some of the set of relevant topics that, when selected, causes the user interface to present a subset of the collection of customer reviews, the subset of the collection of customer reviews being relevant to a respective relevant topic of the at least some of the set of relevant topics.

* * * * *